Feb. 24, 1970  R. L. LARSON  3,496,607
APPARATUS FOR MOLDING A THERMOPLASTIC FILM
BLISTER FOR MERCHANDISE PACKAGING
Filed Feb. 17, 1967  2 Sheets-Sheet 1
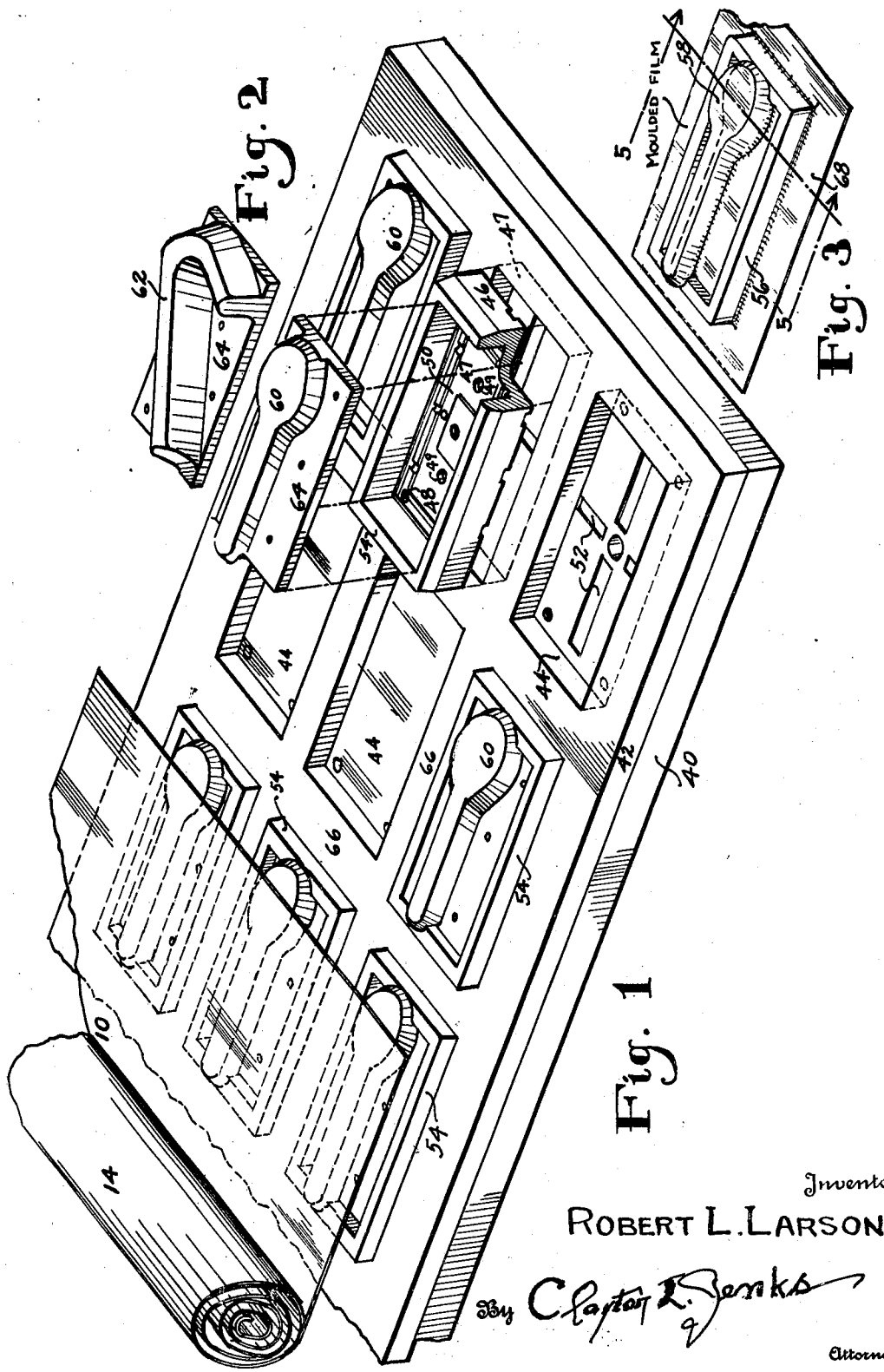
Inventor
ROBERT L. LARSON
By Clayton R. Jenks
Attorney

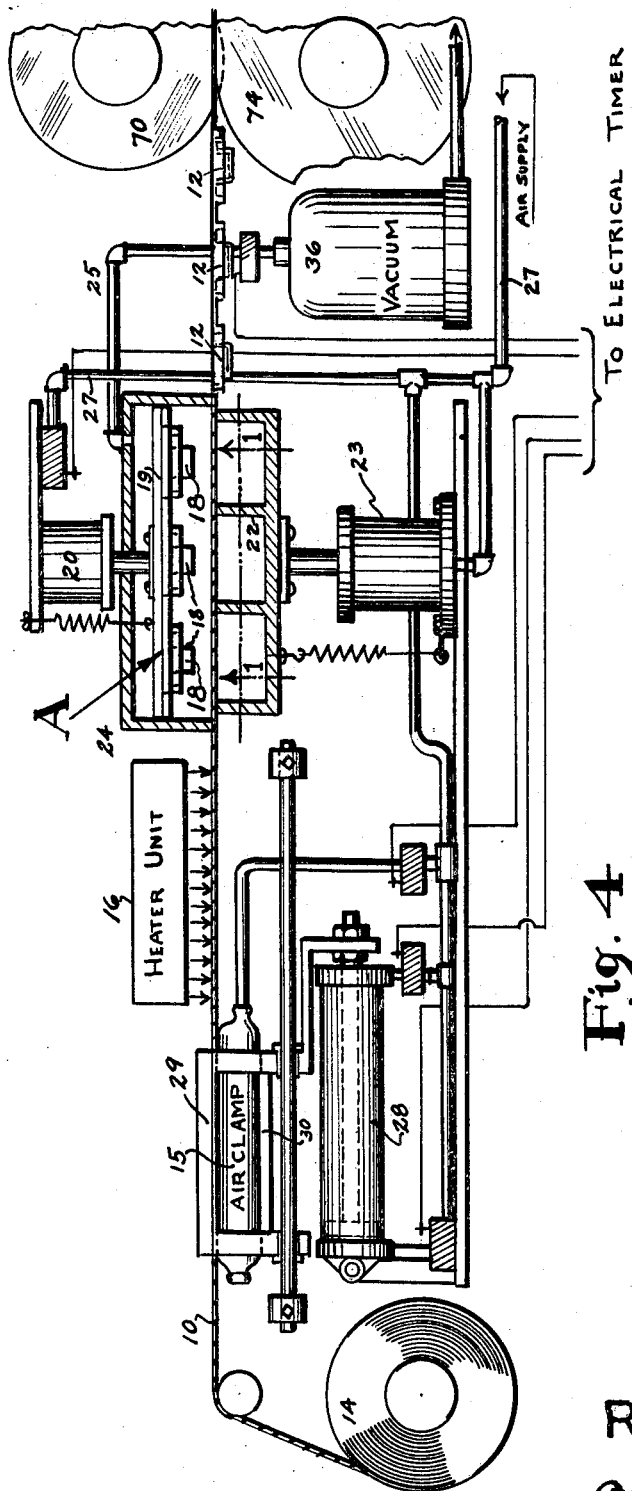
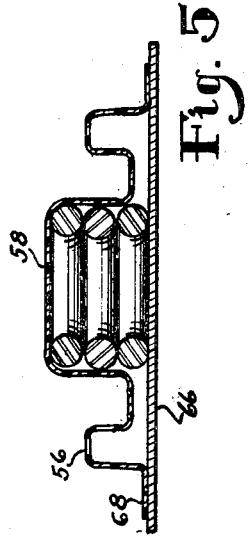
Fig. 4
Fig. 5
Inventor
ROBERT L. LARSON
By Clayton L. Jenks
Attorney

United States Patent Office 3,496,607
Patented Feb. 24, 1970

1

3,496,607
APPARATUS FOR MOLDING A THERMOPLASTIC FILM BLISTER FOR MERCHANDISE PACKAGING
Robert L. Larson, Auburn, Mass., assignor to Parker Metal Goods Company, Worcester, Mass., a corporation of Massachusetts
Filed Feb. 17, 1967, Ser. No. 616,942
Int. Cl. B29c 17/02
U.S. Cl. 18—19                                    2 Claims

ABSTRACT OF THE DISCLOSURE

Apparatus for molding packaging blisters from a heat softened thermoplastic film comprises a base plate having duplicate pockets in which the duplicate bases of annular frame forming molds are fitted and secured. Each frame mold has a central uniformly sized pocket and the duplicate bases of selected blister molds are interchangeably fitted and secured in the central pockets.

---

This invention relates to apparatus for making merchandise packaging blisters from a thermoplastic film. A standard procedure for packaging and displaying merchandise has comprised forming a cup shaped, so-called, blister of plastic film, placing the merchandise in that blister and mounting the same on a backing cardboard or the like. Many types and shapes of blister are required to package the numerous articles to be mounted and displayed.

In accordance with my prior Patent 3,202,280, of Aug. 24, 1965 I have molded a thermoplastic film about each of the articles to be displayed which partially encapsulated and fixed that article in position relative to a backing cardboard. That accomplished the purpose of holding the article tightly in place and without permitting it to move relative to its backing support. There are, however, advantages in the use of the earlier type of blister package for holding many articles loosely, and one object of my invention is to provide a construction whereby the article is closely packaged in a casing of film which conforms with the general outline or shape of the article but does not encapsulate it.

Multi-stage machinery for making a set of blisters of the type shown in the U.S. patent to Rohdin 2,970,414 of Feb. 7, 1961 comprises mechanism for drawing a wide film sheet of a preheated transparent thermoplastic material, such as cellulose acetate or cellulose propionate, across a set of molds suitably arranged in a forming zone where the sheet is subjected to the required temperature and vacuum conditions which cause the film to conform to the shape of the mold. Since thet articles to be merchandised vary widely in shape and size, it has heretofore been required, when a run has been completed for making a given size of blister package, to change the tooling of the machine rather completely. Not only has it been necessary to change the holder for the mold required for each new blister, but the machine has had to be adjusted in many ways, such as to shift the cutter blades which serve to sever the film sheet between the blisters. The dies and other portions of the machine which deal with heat sealing different sized blister margins onto a cardboard also had to be changed. These and many other operations required for making the comparatively simple change from one blister size or shape to another meant that the machine was out of commission for a very considerable period of time and that there was a high expense involved not only in this but in the many accessory tools and services involved in making the changes.

It is accordingly a further object of this invention to minimize that down time of the machine and yet provide the many blister types which will satisfactorily package various shapes and kinds of articles and provide for a quick change of the machine when a new shape or form of blister is required.

A further object is to make various sizes and shapes of blisters within a size range bounded by a peripheral frame of uniform size which substantially conform to the shape of but do not encapsulate or adhere closely to the merchandise itself but will package the same securely and satisfactorily. With these and other objects as will be readily apparent, my invention comprises the structure herein described and claimed.

In the accompanying drawings illustrating a preferred embodiment of the invention:

FIG. 1 is a perspective view taken on a line 1—1 of FIG. 4 showing the underside of a plurality of mold structures in various positions;

FIG. 2 is a perspective view of a blister mold for a slightly different shaped blister from that shown in FIG. 1;

FIG. 3 is a perspective view of the molded blister;

FIG. 4 is a diagrammatic view of one end of the molding machine and associated equipment; and FIG. 5 is a section on the line 5—5 of FIG. 3 showing a final molded product mounted on a cardboard.

Referring first to FIG. 4 of the drawings, I have there shown a blister package making machine of the type set forth in said patent to Rohdin. This comprises a molding apparatus indicated generally by the letter A, in FIG. 4 wherein a strip of film 10 is heat molded to form a series of blister 12. The film 10 is drawn from a supply roll 14 and moved intermittently by means of a reciprocable clamp 15 beneath a radiant heat unit 16 where that film of suitable thermoplastic material, such as a polybutyrate or a polymerizable vinyl substance, is softened to a moldable condition and then passed into the molding zone A where the blisters are formed. The molding apparatus comprises vertically reciprocable molds or male dies 18 which depend from a platen or a base plate 19. These molds are periodically reciprocated vertically by a suitable piston in the hydraulic piston chamber 20. Coordinated with the mold movement is that of a frame or platen 22 which is moved vertically by a piston mechanism 23. The frame 22 comprises walls shaped to fit between the molds 18 and seal the sheet 10 against the underside of the upper plate 19. When the upper plate 19 moves downwardly against the film, the frame 22 moves upwardly as is provided by a suitable time control mechanism. A vacuum is applied to the upper interior of the molding chamber 24 by means of a pipe 25 connected with a vacuum tank 36. The vacuum forces the softened film to be shaped by the molds 18. A suitable compressed air supply is conducted through the pipe 27 to the piston chambers 20 and 23, and the valves are so controlled by electrical timers that the molds 18 and the frame 22 are suitably moved to effect the molding operation.

All of the above described structure may be of suitable or standard apparatus well known in the industry. For example, the air clamp 15 may comprise an expandable rubber bag suitably connected through a valve mechanism with the air supply 27, and the parts are so arranged that when air is admitted to that bag the film 10 is clamped between upper and lower plates 29 and 30 of the clamp. Air admitted to the piston chamber 28 serves through its piston which is connected to the air clamp frame to move the film intermittently toward the right. A reverse motion of the air clamp is provided by admitting air to the right side of the piston in the chamber 28 after the air clamp bag has been deflated, thus returning the clamp to an initial position for moving another section of the film toward the right.

Referring now to FIG. 1, the base plate 40, which is mounted beneath and moves with the platen 19 of FIG. 4, is suitably arranged to be moved by the piston rod of the piston chamber 20 (FIG. 4) and arranged to be reciprocated vertically in the vacuum chamber 24. This plate 40 carries a second plate 42 removably attached thereto. The plate 42 has a set of uniformly spaced pockets 44 of definite and preferably rectangular and uniform shapes and equal sizes. The molds, whatever their shapes may be as required by the articles to be packaged, are constructed and arranged to fit into any one of the pockets. The mold is preferably a two part body; one is shaped to form a ridge like a picture frame around the article to be packaged, such as is shown in my patent 3,202,280, and the other is shaped to form a blister in accordance with the requirements of the article to be packaged. If the blister is to be surrounded by a frame structure, I provide a frame mold 46, shown at the right in FIG. 1, which is dimensioned to fit within the pocket 44 of the base plate 42. This mold 46 has a bottom 47 provided with suitable screw holes 48 and vent holes 49. Also, the bottom 47 is provided with a recessed portion 50 which communicates through the holes 49 with a recessed portion 52 in the bottom of the pocket 44 of the plate 42 whereby a vacuum is readily applied for the molding operation. The mold 46 has a ridge portion 54 which is shaped to stand up above the top level of the plate 42 when the parts are assembled. This ridge therefore serves to form the frame 56 (FIG. 3) of the final molded film substance. In that FIG. 3, the molded blister 58 is shaped to hold a set of screw eyes, for example, and for that purpose a mold 60 (FIG. 1) is shaped to contain the screw eyes, and wherein the right hand rounded portion of the blister engages the head or looped portion of the screw eye sufficiently tightly to hold the point of the screw eye away from the far end of the blister cavity so that it cannot do any damage. If another form of molded blister is to be provided, such as shown in FIG. 2, for packaging a set of wall hooks then the mold 62 is shaped accordingly.

It will be observed by reference to FIG. 1 that the frame forming molds 46 are identical in shape and size and that each provides a uniformly sized central pocket or space within which the mold 60 may be mounted. This mold 60, which may be made of cast aluminum or other suitable substance as is the mold body 46, is mounted on a plate 64 or formed as an integral part thereof. That plate 64 is rectangular in shape and adapted to fit fairly snugly within the pocket of the frame mold 46 as is indicated by the dot and dash lines of the exploded view at the right in FIG. 1. The mold plate 64 is suitably mounted within the mold ring 46 and attached thereto by one or two screws. When the vacuum is applied to the heated film 10 in the molding operation, the film is drawn firmly into contact with both the projecting mold body 60 and the outwardly projecting mold ridge 54, and in between these projecting portions the film is drawn into contact with the substantially flat top 66 of the mold plate 42 and thus forms a flat margin 68 (FIG. 5) around the blister.

As indicated in FIG. 1, a set of nine blisters may be molded at one time. Each of these has a duplicate ridge structure 56 and the molded blister 58 will be determined solely by the shape of the mold 60, 62 or whatever mold is selected from the mold supply. To change the shape of the blister while leaving the frame 56 the same in every case, it is merely required to remove the plate 64 from its pocket in the frame mold 46 and substitute another selected mold shape therefor. If the frame 56 is to be omitted, then the plate 64 will be shaped and sized to fit within the pocket 44 in the plate 42. Therefore it is feasible to make innumerable shapes and sizes of blisters provided their molds will fit within the associated pockets 44 or 54. Hence, the replacement of a mold is merely a matter of applying in each pocket a mold plate of standard and uniform shape and size which carries the required mold shape. This takes only a few minutes time for removing one mold plate and inserting another in its place, since the bases of all blister mold plates are standard in size.

In the molding procedure, the heat softened thermoplastic film 10 is drawn by the vacuum into a form fitting contact with both the ridge structure 54, the mold 60 and the flat surfaces 64 and 66 around the mold. A flat margin 68 (FIG. 3) thus formed around each of the molded structures serves later for the separation of the molded blisters. A standard equipment for this purpose comprises the slicing disks 70 and 74 (FIG. 4) which cut the molded strip into three sections and a further set of knives, not shown, which cut transversely of these strips and separate the blister packages into separate units. Thereafter these separate units may be mounted on cardboards 66 (FIG. 5) in accordance with standard procedure after the blisters have been loaded with the merchandise 68 to be displayed.

It will now be appreciated that the walls of the pockets 44 and frame structures 46 as well as the screws which hold the parts together are each so constructed that it serves as a locating member which holds the mold part in a fixed position. All mold plates 64, whatever may be the shape of the mold carried thereby, are equal in dimensions peripherally and arranged to fit accordingly into the pocket of either the frame 46, or the mold plate 42 if the frame mold is not used. Thus, I may select anyone of innumerable shapes and sizes of mold, such as 60 or 62, but since each of these molds is mounted on a plate 60 of standard dimensions, then this plate is capable of being fitted into any one of the associated pockets. If the ridge 56 surrounding the blister package as shown in FIG. 3 is to be omitted, then the mold plate 60 will fit directly into the pocket 44 in the plate 42 and all of the molds to be employed are accordingly equal sized to fit into that pocket 44.

It will now be understood that, in accordance with my invention, I have provided an apparatus for making diverse sizes and shapes of packaging blisters successively by molding a preheated thermoplastic film by means of a set of blister molds which are removably and interchangeably mounted on a reciprocable base plate, wherein the molds and the base plate have cooperative mounting elements so arranged that anyone or a set of selected molds may be mounted on the base plate in substantially the same positions and patterns, and wherein the molds are shaped to provide film margins around the blisters which are arranged to be slit or sliced for separating the blisters and mounting the margins on cardboards. Preferably, the base plate is provided with a set of duplicate pockets and the molds have duplicate bottom plates which fit in each of the pockets and are removably secured therein, as by screws. Also, the molds are preferably two part bodies, one part having an upstanding annular member capable of forming a film frame within which member is a central pocket shaped for mounting any one of the other mold parts. Hence, to replace a blister mold, it is merely necessary to take out one or two screws, remove the blister mold, apply another mold in the pocket and secure it in place. Since the flat surfaces surrounding the blister molds which form margins around the blisters have substantially the same sizes and shape, the film strip may be run through the slicing and slitting stage, whatever may be the shape of the blister. Usually, the frame forming mold is not changed and it determines the uniformity of the molded margin.

It will now be appreciated that various substitutions and modifications may be made in this apparatus without departing from the scope of the invention as set forth in the appended claims.

I claim:

1. In apparatus for forming diverse shapes of separate packaging blisters comprising means for progressively feeding a strip of heat softened film to molding apparatus having a reciprocable platen carrying thereon a set of molds by which the film is formed as cup shaped blisters to be subsequently loaded with merchandise and cutter blades for severing the film between the blisters and forming separate blister units, said molding apparatus comprising a base plate mounted on said platen, a set of molds of different shapes and sizes from which any of a plurality of molds may be selected, a set of mold plates on which the molds are individually mounted, said base plate having duplicate pockets and all of the mold plates in the set having duplicate parts interchangeably and removably mounted in and located by any of said pockets, and removable means for securing each mold plate in its associated pocket in substantially the same film molding position, said mold plates having surfaces arranged to form substantially flat film margins adjacent to the molded blisters which are shaped to be sliced by said cutter blades to form separate blister units.

2. Molding apparatus according to claim 1 which comprises a second plate removably interfittable in any pocket of the base plate and having an upstanding substanstanially annular member shaped to form a frame of film around the molded blister and provide an outer pocket for the mold plate, each of said mold plates of the set being interchangeably interfittable within said outer pocket, and means for removably securing said second plate and said mold plate respectively in their pockets.

References Cited
UNITED STATES PATENTS

| | | |
|---|---|---|
| 2,301,125 | 11/1942 | Kramp et al. |
| 2,518,565 | 8/1950 | Nicolle. |
| 2,967,328 | 1/1961 | Shelby et al. |
| 3,061,881 | 11/1962 | Sherno. |
| 3,135,998 | 6/1964 | Fowler et al. |
| 3,225,387 | 12/1965 | Angilello et al. |
| 3,346,923 | 10/1967 | Brown et al. |
| 3,378,888 | 4/1968 | Robertson. |

WILLIAM J. STEPHENSON, Primary Examiner

U.S. Cl. X.R.

18—44